United States Patent [19]
Kampe

[11] 3,944,380
[45] Mar. 16, 1976

[54] DIRT EXTRACTING NOZZLE

[75] Inventor: Johannes F. E. Kampe, Torrance, Calif.

[73] Assignee: The Garrett Corporation, Los Angeles, Calif.

[22] Filed: Dec. 20, 1973

[21] Appl. No.: 426,983

[52] U.S. Cl. ............... 415/1; 415/121 A; 415/168; 55/405
[51] Int. Cl.² ........................................ F04D 29/70
[58] Field of Search ........... 415/121 A, 121 G, 168, 415/DIG. 1, 1; 55/405

[56] References Cited
UNITED STATES PATENTS

| 845,044 | 2/1907 | Baldwin | 415/121 G |
| 911,802 | 2/1909 | Baldwin | 415/121 G |
| 1,958,145 | 5/1934 | Jones | 415/DIG. 1 |
| 2,005,646 | 6/1935 | Brunzel | 415/168 |
| 2,111,878 | 3/1938 | Tongeren | 415/168 |
| 2,288,734 | 7/1942 | Noack | 415/168 |
| 3,274,757 | 9/1966 | Wapler | 415/168 |
| 3,380,711 | 4/1968 | Blattner et al. | 415/121 G |
| 3,720,045 | 3/1973 | Murphy | 415/121 A |
| 3,785,128 | 1/1974 | Redemann | 415/121 G |

FOREIGN PATENTS OR APPLICATIONS

| 993,476 | 5/1965 | United Kingdom | 415/168 |

*Primary Examiner*—C. J. Husar
*Attorney, Agent, or Firm*—Albert J. Miller; Joel D. Talcott; Regis E. Slutter

[57] ABSTRACT

Disclosed is a method of and a nozzle for extracting dirt particles introduced into a radial inflow turbine.

9 Claims, 5 Drawing Figures

DIRT EXTRACTING NOZZLE

BACKGROUND OF THE INVENTION

In radial inward flow turbine nozzles, erosion of the inner surface of the nozzle by dirt particles thrown outward by the turbine wheel blades can greatly reduce the life of the nozzle. It is believed that any particles introduced into the nozzle ring continue to spin inside the ring at a high velocity for many revolutions until the particles are broken down to fractions fine enough to be drawn along with the turbine air and discharged through the eye of the impeller. Since a particle thus rotates many times inside the nozzle ring it produces continuous wear on the inner surface of the nozzle until it is reduced in size and discharged.

Attempts to alleviate this problem have included filtering the fluid before it enters the turbine nozzle. To do this, however, 5 to 10 percent of the air has to be discharged as filter purge air at an average of at least one PSI pressure drop of the full air stream. In addition, the filter, possible bypass, and the required controls attendant thereto add weight to the system. Thus this solution is not satisfactory for many applications.

Alternately, a composite nozzle including an inner nozzle ring of an erosion resistant material such as described in U.S. Pat. No. 3,737,247, can be utilized. While this has proven to be satisfactory in many applications, it still does not alleviate the basic problem.

SUMMARY OF THE INVENTION

The present invention incorporates a sloping surface on the inside diameter of the turbine nozzle to direct the contaminants to an extractor groove in the nozzle at the greater inner diameter of the nozzle. Tangential purge holes are provided from this extractor groove to the exterior of the nozzle. Any dirt or particles introduced into the turbine nozzle will thus be directed by the slope of the inner nozzle diameter into the extractor groove from which they can be extracted or discharged.

DESCRIPTION OF THE PREFERRED EMBODIMENT

Figure 1:
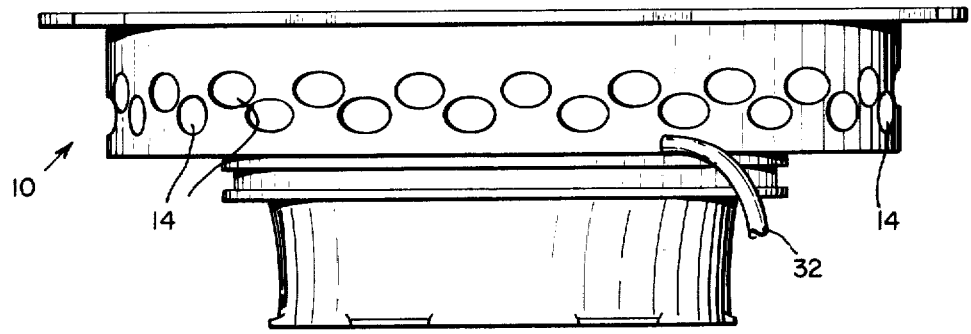
FIG. 1 is a top plan view of the turbine nozzle of the present invention.
Figure 2:
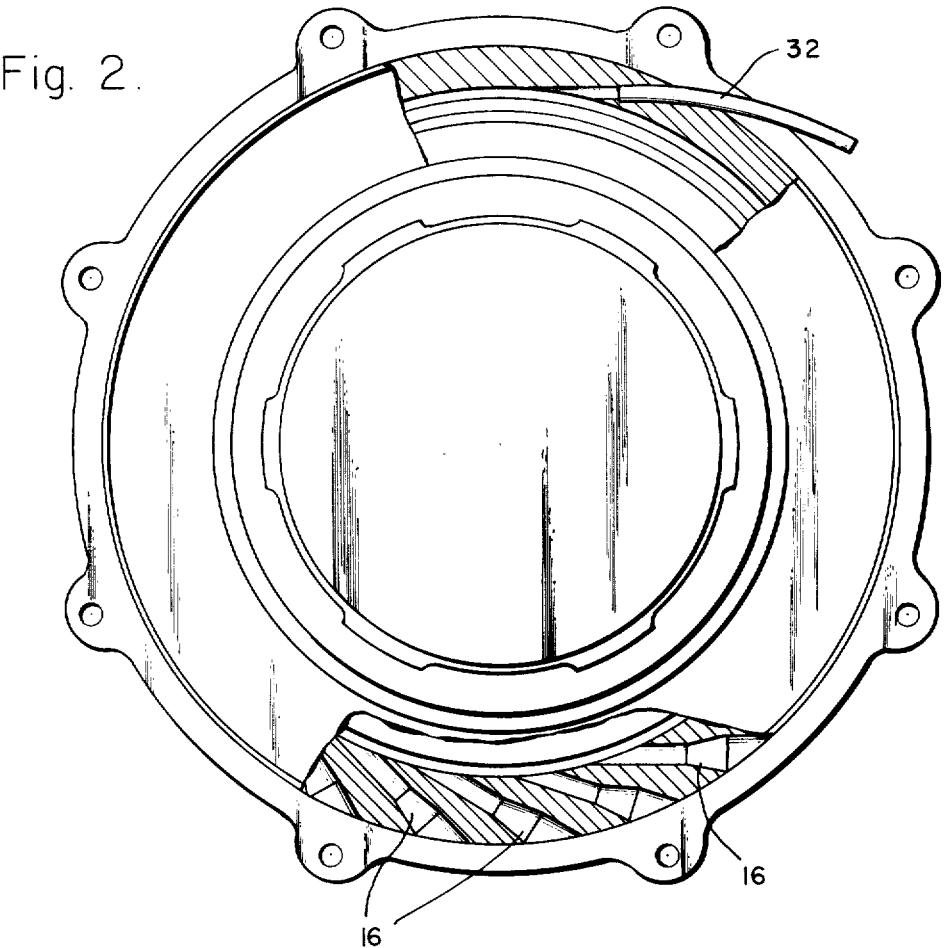
FIG. 2 is a front view, partially cut away, of the turbine nozzle of FIG. 1.
Figure 3:
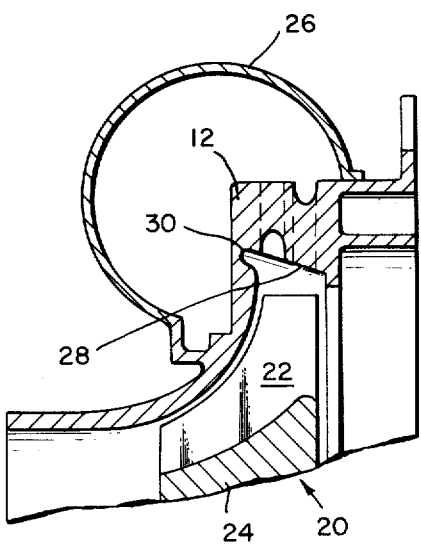
FIG. 3 is a sectional view of the turbine nozzle of FIGS. 1 and 2.

FIGS. 1, 2, and 3 generally illustrate the turbine nozzle 10 of the present invention. This turbine nozzle 10 generally comprises a turbine nozzle ring 12, having a plurality of spaced nozzle passages 14 through which fluid is directed through the turbine nozzle ring 12. The nozzle ring 12 would include at least one row of these passages 14. For purposes of illustration, two rows of individually staggered passages 14 are shown. These passages 14 may be provided with an enlarged tapered inlet section 16 to facilitate flow entry. This nozzle ring 12 would normally be constructed of an easily fabricated material such as steel and the nozzle passages 14 machined to a precise dimensional tolerance sufficient to control the flow of fluid therethrough. Rotatively disposed within the turbine nozzle 10 is a turbine wheel 20 having a plurality of turbine blades 22 disposed on hub 24. The turbine blades 22 are disposed to receive fluid from the passages 14 in the turbine nozzle ring 12. An annular torus 26 is disposed around the turbine nozzle ring 12 to deliver fluid to the passageways 14.

As shown clearly in FIG. 3, the inner surface 28 of the nozzle ring 12 is sloped from a first inner diameter away from the turbine discharge to a greater inner diameter towards the turbine discharge. At this greater diameter, an annular extractor groove or slot 30 is provided. The inner surface 28 of the turbine nozzle ring 12 is thus in the form of a conical or truncated conical surface. As shown in FIG. 2, at least one generally tangential discharge port 32 connects the groove 30 to the exterior of the turbine nozzle.

In operation, any dust or dirt particles introduced into the turbine nozzle reaching the space between the inner surface 28 of the turbine nozzle ring 12 and the turbine blades 22 will be forced by its centrifugal mass forces to migrate to the extractor groove 30 around the interior of the nozzle ring 12. From the extractor groove 30 these particles will then pass out of the turbine nozzle through port 32.

Figure 5:
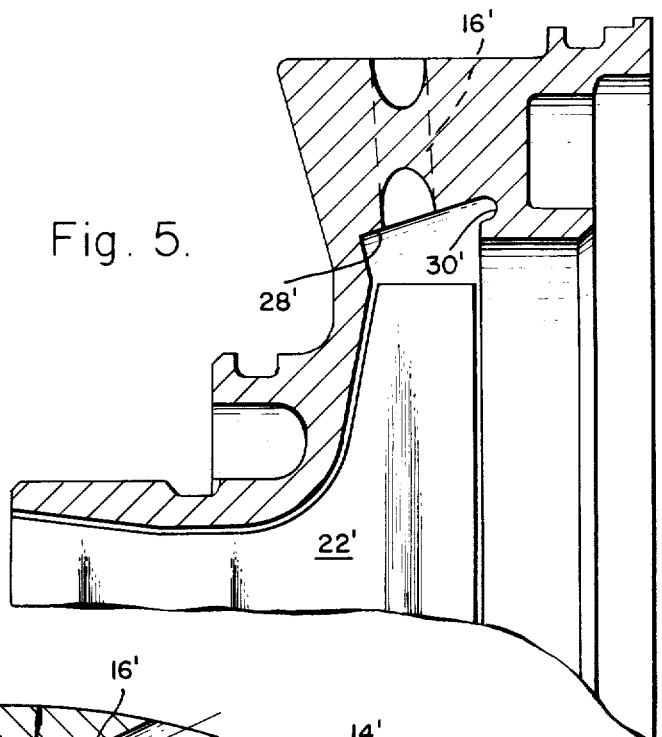
FIG. 5 is a sectional view of the turbine nozzle of FIG. 4.
Figure 4:
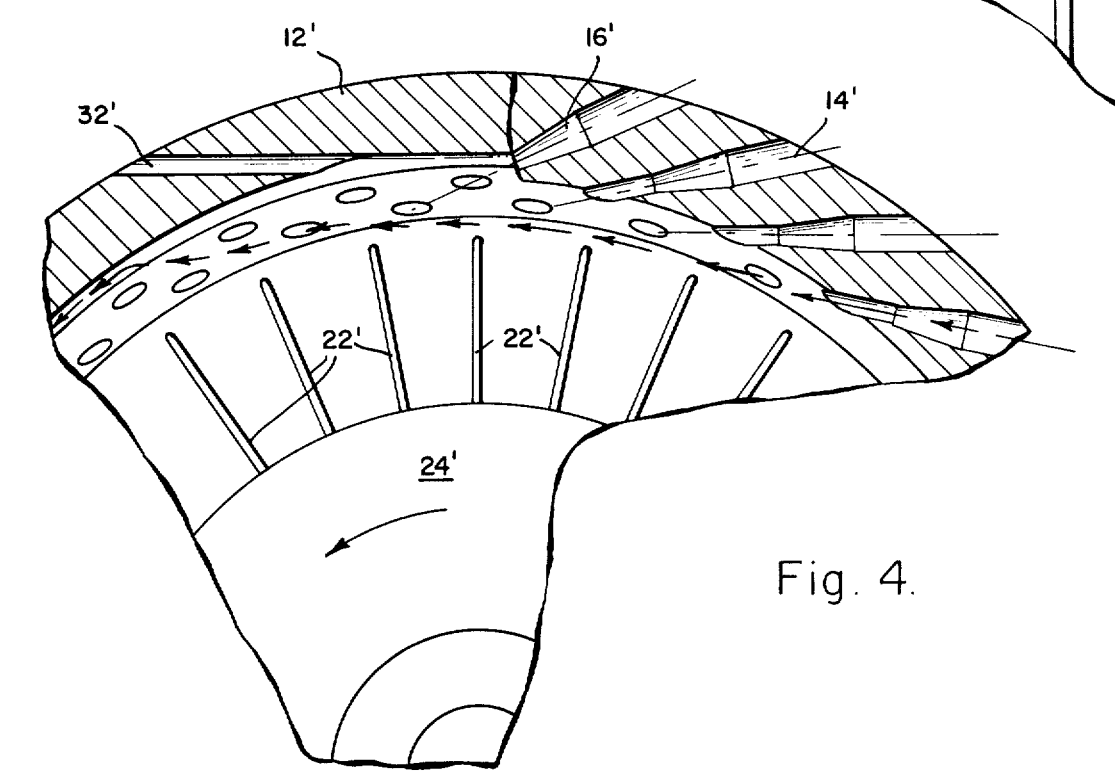
FIG. 4 is a sectional view of an alternate embodiment of the turbine nozzle of the present invention.

While FIGS. 1, 2, and 3 illustrate a turbine nozzle having an inner surface with the greater diameter at the turbine discharge, FIGS. 4 and 5 illustrate an alternate embodiment in which the diameter of the inner surface of the turbine nozzle ring increases as the distance from the turbine discharge increases. There are applications in which either of these two embodiments would have advantages over the other, but the basic construction and operation would be identical except for the direction of slope. As shown in FIG. 5, the nozzle passages 14' may be sloped or tilted in the direction of the extractor groove 30 to initially direct any dirt particles towards the groove. This slight nozzle passage slope does add to the dirt extracting efficiency.

It is generally known that particles less than ten microns in size cause little or no erosion on the interior nozzle ring surface and thus the present invention is primarily directed towards collecting particles larger than ten microns. It has been demonstrated that this can be accomplished by the present invention without any pressure drop or the addition of any significant weight. In addition, significantly less than one percent of the turbine fluid flow is utilized as purge air to carry the dirt particles out from the extractor groove. Very little erosion is caused since continuous spinning of the particles inside the nozzle ring is eliminated. The particles will roll or migrate towards the larger diameter in a very short period of time and accumulate in the annular groove from which they are discharged through the tangential port or ports. Since the particles strike the inner surface at a very small angle, minimum breakdown of the particles occurs. The rotating fluid mass and pressure gradients across the port 32 provide the force required to first collect the dirt particles and then to discharge the dirt particles.

Since the dirt particles are not continuously carried in the interior of the nozzle until they are reduced in size and discharged but are removed before this occurs, the fluid discharged from the turbine will be cleaner and thus not contaminate systems which might utilize the turbine fluid discharge. For example, in an aircraft environmental control system, bleed air from an aircraft engine compressor, which is frequently contaminated with dirt or dust particles, is used to drive the turbine. By utilizing the dirt extractor of the present invention the dirt is discharged before it reaches the components arranged downstream in the system. The water separator and anti-icing systems which are downstream of the turbine exhaust, therefore have increased reliability and longer intervals between maintenance. Further, since this turbine exhaust may finally be utilized as conditioning air in the aircraft, the airplane itself, namely the windows and interiors, will remain cleaner.

While specific embodiments of the invention have been illustrated and described, it is to be understood that these embodiments are provided by way of example only and the invention is not to be construed as being limited thereto but only by the proper scope of the following claims.

I claim:

1. A method of extracting solid particles from an expansible gas stream while flowing through a radial inflow turbine comprising the steps of:
   centrifugally migrating the solid particles downstream from the nozzles toward one axial end of the inner surface of the turbine nozzle ring;
   collecting the centrifugally migrated solid particles at this axial end of the turbine nozzle ring; and
   tangentially discharging a portion of the gas with the collected solid particles from this axial end of the turbine nozzle ring to the exterior of the radial inflow turbine nozzle.

2. The method according to claim 1 wherein said migrating step occurs substantially throughout the axial extent of the inlet of the channels between the blades of said radial turbine.

3. The method according to claim 2 wherein said collecting step occurs in a zone axially offset from said inlet of the channels.

4. A method of extracting solid particles while flowing through an expansible gas stream from a radial inflow turbine comprising the steps of:
   conically sloping the inner surface of the turbine nozzle ring to centrifugally force the solid particles towards the base of the conically sloping inner surface;
   providing a solid particles collecting groove at the base of the conical slope of the inner surface of the turbine nozzle ring; and
   tangentially discharging from the turbine nozzle ring the solid particles collected in the particle collecting groove.

5. The method according to claim 4 including the additional step of directing said gas stream through nozzles in said nozzle ring to induce circumferential migration of solid particles along said inner surface and said discharging step being accomplished by conducting a portion of said gas with said solid particles in said circumferential direction through a passage in said nozzle ring.

6. A radial inflow turbine comprising:
   a radial inflow turbine wheel; and
   a turbine housing rotatably supporting said turbine wheel therein and including a turbine nozzle ring radially disposed around said turbine wheel to direct a flow of fluid thereto,
   said turbine nozzle ring having an inclined inner surface to direct any solid particles in the fluid flow towards one axial end of the turbine nozzle ring, a groove extending around the inner surface of the turbine nozzle ring at the axial end to which the solid particles are directed by the inclined surface, and at least one tangential passageway in said turbine nozzle ring extending from the circumferential groove to the exterior of said turbine housing.

7. The radial inflow turbine of claim 6 wherein the turbine nozzles in said turbine nozzle ring are tilted for initially directing solid particles towards the circumferential groove axial end of the inclined inner surface of said turbine nozzle.

8. In a radial inflow turbine for connection to a source of pressurized fluid with solid particles entrained therein, the radial inflow turbine having a housing, a radial inflow turbine wheel and turbine nozzle means for accelerating and directing fluid from the source of the turbine wheel, means for separating solid particles from said pressurized fluid so that wear of the turbine nozzle means is reduced, the means for separating comprising:
   said turbine nozzle means including a nozzle ring having a conical inner surface coaxial with said turbine;
   said inner surface being substantially coextensive with the channels between the blades, the radial inflow turbine wheel defining with said wheel a space within which solid particles entrained in the fluid are free to migrate radially outwardly and axially toward one axial end of the nozzle ring; and
   the nozzle ring also including a circumferentially extending groove at said one axial end of said inner surface, said groove being axially offset from the channels between the blades of said turbine wheel and being positioned to receive solid particles which have centrifugally migrated radially and axially along the inclined inner surface, said nozzle ring also including a tangential discharge port that is operable to exhaust separated solid particles from the radial inflow turbine.

9. The radial inflow turbine of claim 8 wherein the nozzles in said nozzle ring are inclined to direct solid particles entrained by the fluid toward the circumferentially extending groove.

* * * * *